US006477488B1

(12) United States Patent
Bellegarda

(10) Patent No.: US 6,477,488 B1
(45) Date of Patent: Nov. 5, 2002

(54) METHOD FOR DYNAMIC CONTEXT SCOPE SELECTION IN HYBRID N-GRAM+LSA LANGUAGE MODELING

(75) Inventor: Jerome R. Bellegarda, Los Gatos, CA (US)

(73) Assignee: Apple Computer, Inc., Cupertino, CA (US)

( * ) Notice: Subject to any disclaimer, the term of this patent is extended or adjusted under 35 U.S.C. 154(b) by 0 days.

(21) Appl. No.: 09/523,070

(22) Filed: Mar. 10, 2000

(51) Int. Cl.[7] .......................... G06F 17/20; G06F 17/27; G10L 15/00
(52) U.S. Cl. ................................ 704/9; 704/1; 704/255
(58) Field of Search .......................... 704/9, 1, 10, 251, 704/256, 257, 255; 707/530, 531; 706/55, 56

(56) References Cited

U.S. PATENT DOCUMENTS

| | | | | |
|---|---|---|---|---|
| 5,301,109 A | * | 4/1994 | Landauer et al. | 704/9 |
| 5,317,507 A | * | 5/1994 | Gallant | 707/532 |
| 5,325,298 A | * | 6/1994 | Gallant | 704/9 |
| 5,621,859 A | | 4/1997 | Schwartz et al. | 704/256 |
| 5,675,819 A | * | 10/1997 | Schuetze | 704/10 |
| 5,712,957 A | | 1/1998 | Waibel et al. | 704/240 |
| 5,839,106 A | | 11/1998 | Bellegarda | 704/257 |
| 5,867,799 A | * | 2/1999 | Lang et al. | 707/1 |

OTHER PUBLICATIONS

Bellegarda, J., "A Latent Semantic Analysis Framework For Large–Span Language Modeling," Proc. EuroSpeech '97 Rhodes, Greece, Sep. 1997, pp. 1451–1454.
Bellegarda, J., "A Multispan Language Modeling Framework for Large Vocabulary Speech Recognition," IEEE Transaction on Speech and Audio Processing, vol. 6, No. 5, Sep. 1998, pp. 456–467.

* cited by examiner

Primary Examiner—Patrick N. Edouard
(74) Attorney, Agent, or Firm—Blakely, Sokoloff, Taylor & Zafman LLP

(57) ABSTRACT

A method and system for dynamic language modeling of a document are described. In one embodiment, a number of local probabilities of a current document are computed and a vector representation of the current document in a latent semantic analysis (LSA) space is determined. In addition, a number of global probabilities based upon the vector representation of the current document in an LSA space is computed. Further, the local probabilities and the global probabilities are combined to produce the language modeling.

44 Claims, 6 Drawing Sheets

METHOD FOR DYNAMIC CONTEXT SCOPE SELECTION IN HYBRID N-GRAM+LSA LANGUAGE MODELING

FIELD OF THE INVENTION

The present invention relates to language modeling systems and more particularly to dynamic selection of context scope in latent semantic analysis (LSA) language modeling.

BACKGROUND OF THE INVENTION

In general, speech recognition is the process of converting acoustic signal into a linguistic message. In certain applications, for example where a speech recognition processor serves as a user interface to a database query system, the resulting message may need to contain enough information to reliably communicate a speaker's goal in accessing the database. However, in an application such as automated dictation or computer data entry, it may be necessary that the resulting message represents a verbatim transcription of a sequence of spoken words. In either case, an accurate statistical, or stochastic, language model is desirable for successful recognition.

Stochiastic language modeling places such a role in large vocabulary speech recognition in which it is typically used to constrain the acoustic analysis, guide the search through various (partial) text hypothesis, and/or contribute to the determination of the final transcription. Statistical language models using both syntactic and semantic information have been developed. This approach embeds latent semantic analysis (LSA), which is used to capture meaningful word associations in the available context of a document, into standard n-gram paradigm, which relies on the probability of occurrence in the language of all possible strings of N words.

This new class of language models, referred to as (multi-span) hybrid N-gram plus LSA models have shown a substantial reduction in perplexity. In addition, multi-span models have also been shown to significantly reduce word error rate. However, their overall performance tends to be sensitive to a number of factors. One such factor is the training data used to derive the statistical parameters, in particular those associated with the LSA component. This problem is common in statistical language modeling and can be solved by careful matching or training and test conditions. In addition, a dynamic selection of the LSA context scope during recognition affects the overall effectiveness of the hybrid models.

SUMMARY OF THE INVENTION

A method and system for dynamic language modeling of a document are described. In one embodiment, a number of local probabilities of a current document are computed and a vector representation of the current document in a latent semantic analysis (LSA) space is determined. In addition, a number of global probabilities based upon the vector representation of the current document in an LSA space is computed. Further, the local probabilities and the global probabilities are combined to produce the language modeling.

BRIEF DESCRIPTION OF THE DRAWINGS

Features and advantages of the present invention will be apparent to one skilled in the art in light of the following detailed description in which.

DETAILED DESCRIPTION

A method and system for dynamic language modeling of a document are described. In one embodiment, a number of local probabilities of a current document are computed and a vector representation of the current document in a latent semantic analysis (LSA) space is determined. In addition, a number of global probabilities based upon the vector representation of the current document in an LSA space is computed. Further, the local probabilities and the global probabilities are combined to produce the language modeling.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description that follows are presented in terms of algorithms and symbolic representations of operations on data bits within a computer memory in the form of a computer program. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

Figure 1:
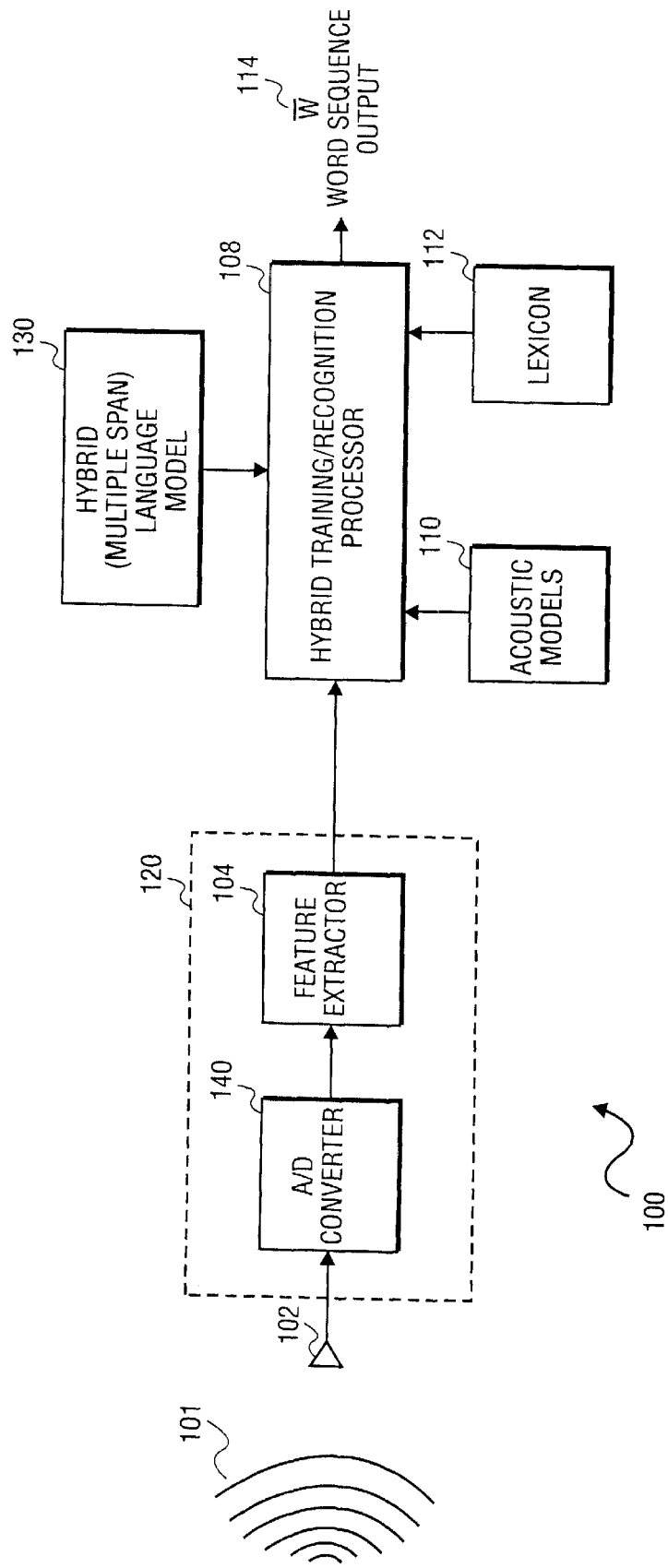
FIG. 1 is a block diagram of one embodiment for a hybrid speech recognition system.

FIG. 1 is a block diagram of one embodiment for a hybrid speech recognition system 100. Referring to FIG. 1, an input signal 101 is received by transducer 102. The transducer is connected to a signal preprocessor 120. In one embodiment, signal preprocessor includes analog to digital (A-D) converter 140 and feature extractor 104. Acoustic signal 101 is input to transducer 102 and the output of the transducer 102 is coupled to an input of the AD converter 140.

Output from transducer 120 is sent to hybrid training-recognition processor 108. Hybrid training/recognition processor 108 performs speech recognition using a hybrid language model 130 which combines local and global language constraints to realize both syntactic and semantic modeling benefits. Hybrid training recognition processor 108 uses acoustic models 110 and a Lexicon 112 to evaluate the feature vectors output by the feature extractor 104. In general, the Lexicon 112 defines the vocabulary of the recognition system 100 and terms the basic speech elements (words) and a language model 130 defines allowable sequence of vocabulary items. Hybrid training recognition processor 108 combines N gram syntactic analysis with latent semantic analysis (LSA) as described in U.S. Pat. No. 5,839,106, entitled "Large-Vocabulary Speech Recognition Using an Integrated Syntactic and Semantic Statistical Language Model", which is incorporated herein by reference. Hybrid training/recognition processor 108 outputs a word sequence output 114.

Figure 2:
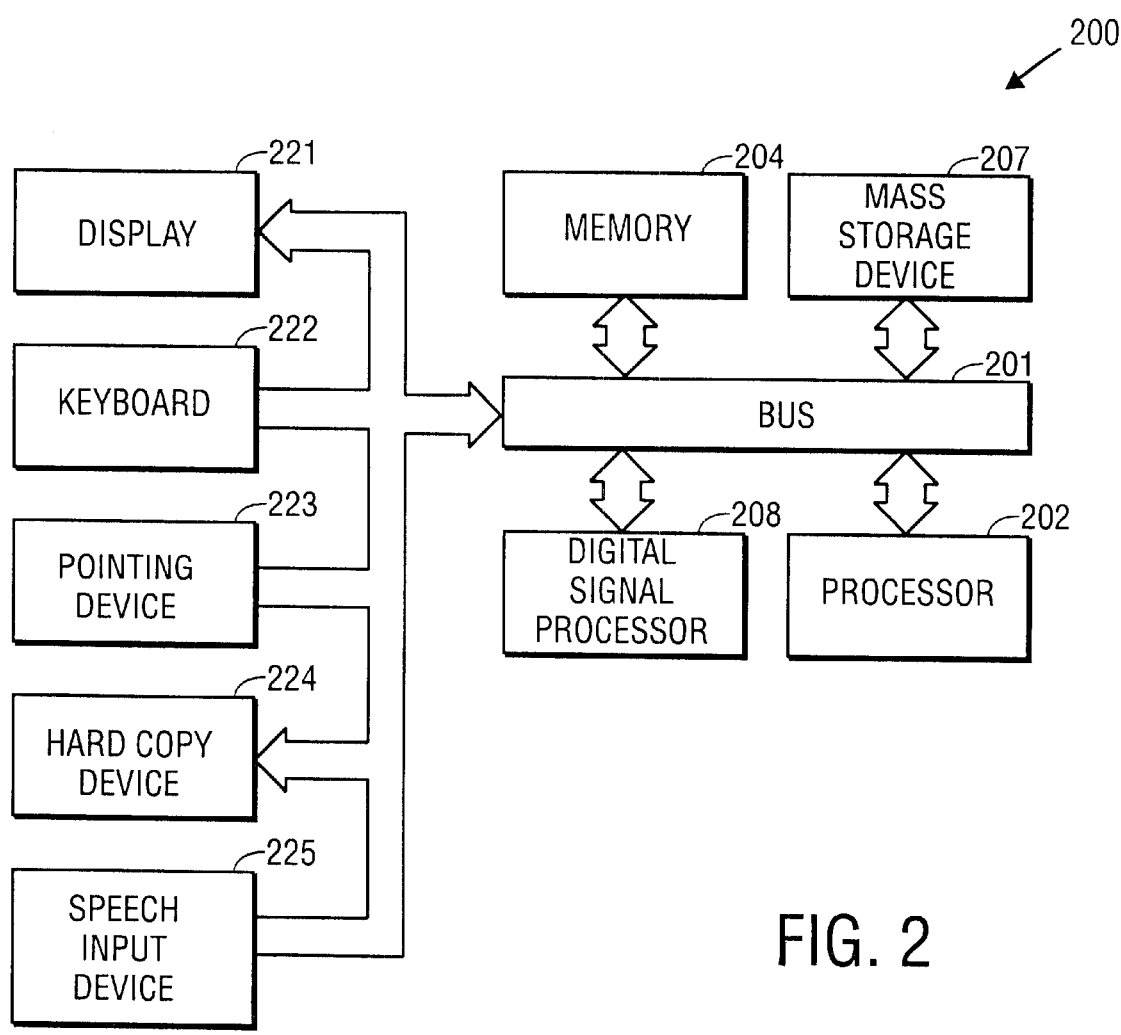
FIG. 2 is a block diagram of one embodiment for a computer system architecture of a hybrid speech recognition system.

FIG. 2 is a block diagram of one embodiment for a computer system architecture for a hybrid speech recognition system. Referring to FIG. 2, computer system 200 includes processor 202, digital signal processor 208, memory 204, and mass storage device 207 connected via system bus 201. System bus 201 is also coupled to received inputs from a keyboard 222, pointing device 223, speech signal input device 225. In addition, system bus 201 provides outputs to display device 221 and hard copy device 224.

Figure 3:
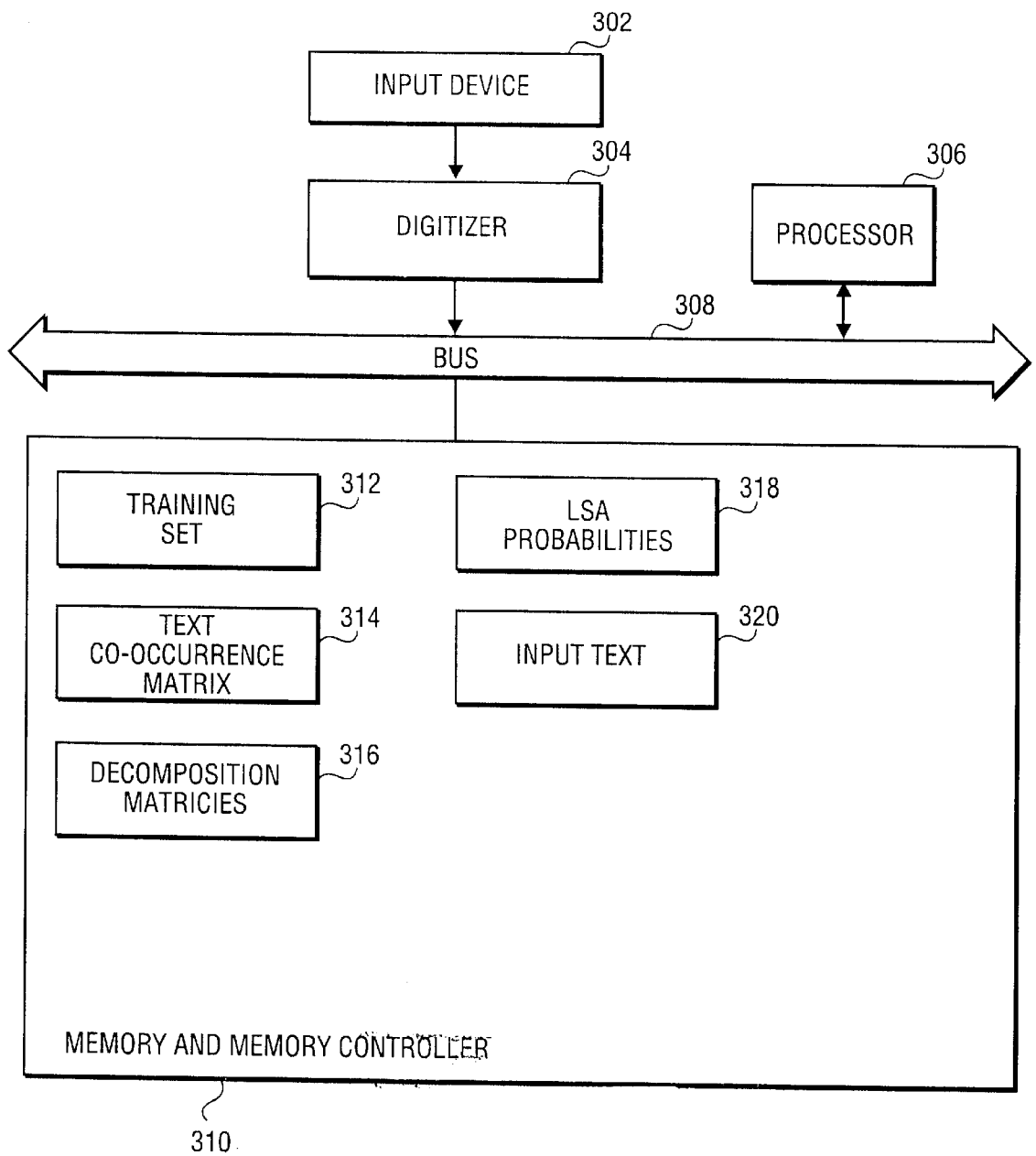
FIG. 3 is a block diagram of one embodiment for a computer system memory of FIG. 2.

FIG. 3 is a block diagram of one embodiment for a computer system memory of computer system 200. Referring to FIG. 3, input device 302 provides speech signals to a digitizer 304. Digitizer 304, or feature extractor, samples and digitizes the speech signals for further processing. Digitizer 304 may include storage of the digitized speech signals in the speech input data memory component of memory 310 via system bus 308. Digitized speech signals are processed by digital processor 306 using algorithms and data stored in the components of memory 310.

In one embodiment, digitizer 304 extracts spectral feature vectors every 10 milliseconds. In addition, short term Fast Fourier Transform followed by a Filter Bank Analysis are used to ensure a smooth spectral envelope of the input spectral features. The first and second order regression coefficients of the spectral features are extracted. The first and second order regression coefficients, typically referred to as delta and delta-delta parameters, are concatenated to create training set 312. During the training phase, a collection T of N articles is input into training set 312. Training set 312 contain a number of words that constitutes a vocabulary V. In one embodiment, the occurrences of each word $v_i$ in V is counted and saved as text co-occurrence matrix 314 which is an M×N matrix, W, which represents the co-occurrences between words in V and documents in T. In one embodiment, a singular value decomposition (SVD) of the matrix W is computed. The computation is as follows:

$$W \approx W' = USV^T \quad (1)$$

in which U is the M×R matrix of left singular vectors, $u_i$ ($1 \leq i \leq M$), S is the (R×R) diagonal matrix of singular values $s_r$ ($1 \leq r \leq R$), V is the (N×R) matrix of right singular vectors $v_i$ ($1 \leq i \leq N$), R<<M, N is the order of the decomposition, and $^T$ denotes matrix transposition. The LSA method uses the SVD to define a mapping between the discrete sets M and T, and the continuous vector space S spanned by U and V. As a result, each word $w_i$ in M is represented by a vector $u_i$ in S, and each document $d_j$ in T is represented by a vector $v_j$ in S. This mapping makes it possible to compute the following LSA language model probability:

$$Pr(w_q|H_{q-1}) = Pr(w_q|\tilde{d}_{q-1}), \quad (2)$$

where $w_q$ is the current word and $H_{q-1}$ is the associated history for this word, i.e., the current document so far (also referred to as the current pseudo-document). This is done in three steps: (i) construct sparse representations $w_q$ and $\tilde{d}_{q-1}$ for the current word and pseudo-document, (ii) map these quantities to vectors $u_q$ and $\tilde{v}_{q-1}$ in the space S, and (iii) uses a suitable measure in S to evaluate the closeness between $u_q$ and $\tilde{v}_{q-1}$.

This in turn leads to the hybrid n-gram+LSA language model probability:

$$Pr(w_q|\tilde{H}_{q-1}) = \frac{Pr(w_q|w_{q-1}w_{q-2}\ldots w_{q-n+1})Pr(\tilde{d}_{q-1}|w_q)}{\sum_{w_i \in V} Pr(w_i|w_{q-1}w_{q-2}\ldots w_{q-n+1})Pr(\tilde{d}_{q-1}|w_i)}, \quad (3)$$

where $\tilde{H}_{q-1}$ is the overall available history (comprising an n-gram component as well as the LSA component mentioned above).

Memory 310 also includes input text 320 for the storage of utterances to recognize. During recognition, the speaker inputs utterances for processing. In a method similar to that discussed above, the recognition input is normalized and stored into input text 320.

Figure 4:
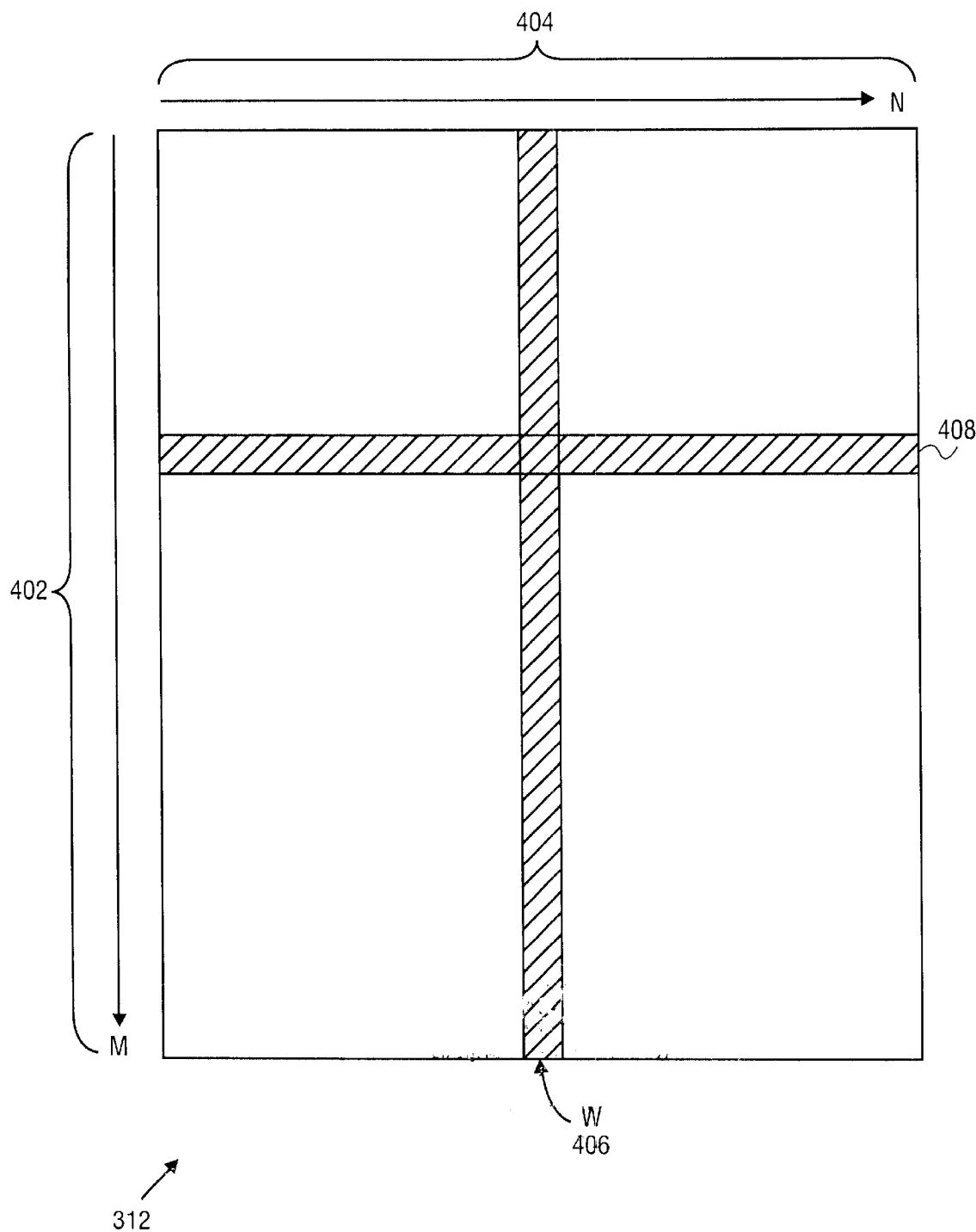
FIG. 4 is a block diagram of one embodiment for a text co-occurrence matrix of FIG. 3.

FIG. 4 is a block diagram of one embodiment for text co-occurrence matrix 314 which is a matrix of M words 420 of dimension N documents 404. In one embodiment, M=20,000 words and N=500,000 documents.

Figure 5:
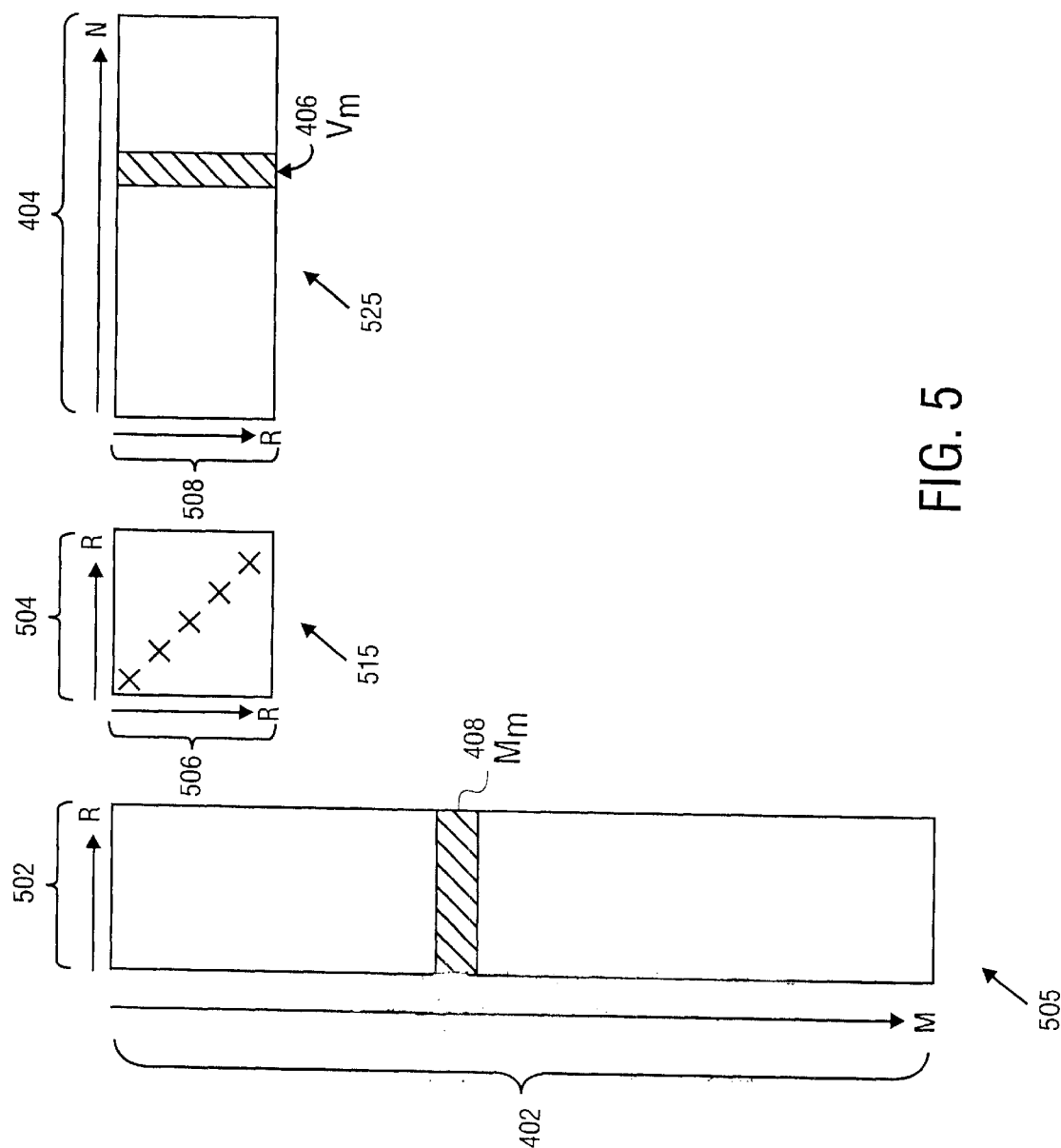
FIG. 5 is a block diagram of one embodiment for singular value decomposition matrices of the co-occurrence matrix of FIG. 4.

FIG. 5 is a block diagram of one embodiment for decomposition matrices 316. In one embodiment, singular value decomposition (SVD) of the matrix W is performed. The decomposition is as follows:

$$W \approx W' = USV^T \quad (4)$$

in which U is the M×R matrix of left singular vectors, $u_i$ ($1 \leq i \leq M$), S is the (R×R) diagonal matrix of singular values $s_r$ ($1 \leq r \leq R$), V is the (N×R) matrix of right singular vectors $v_i$ ($1 \leq i \leq N$), R<<M, N is the order of the decomposition, and $^T$ denotes matrix transposition. The LSA method uses the SVD to define a mapping between the discrete sets M and T, and the continuous vector space S spanned by U and V. As a result, each word $w_i$ in M is represented by a vector $u_i$ in S, and each document $d_j$ in T is represented by a vector $v_j$ in S.

Figure 6:
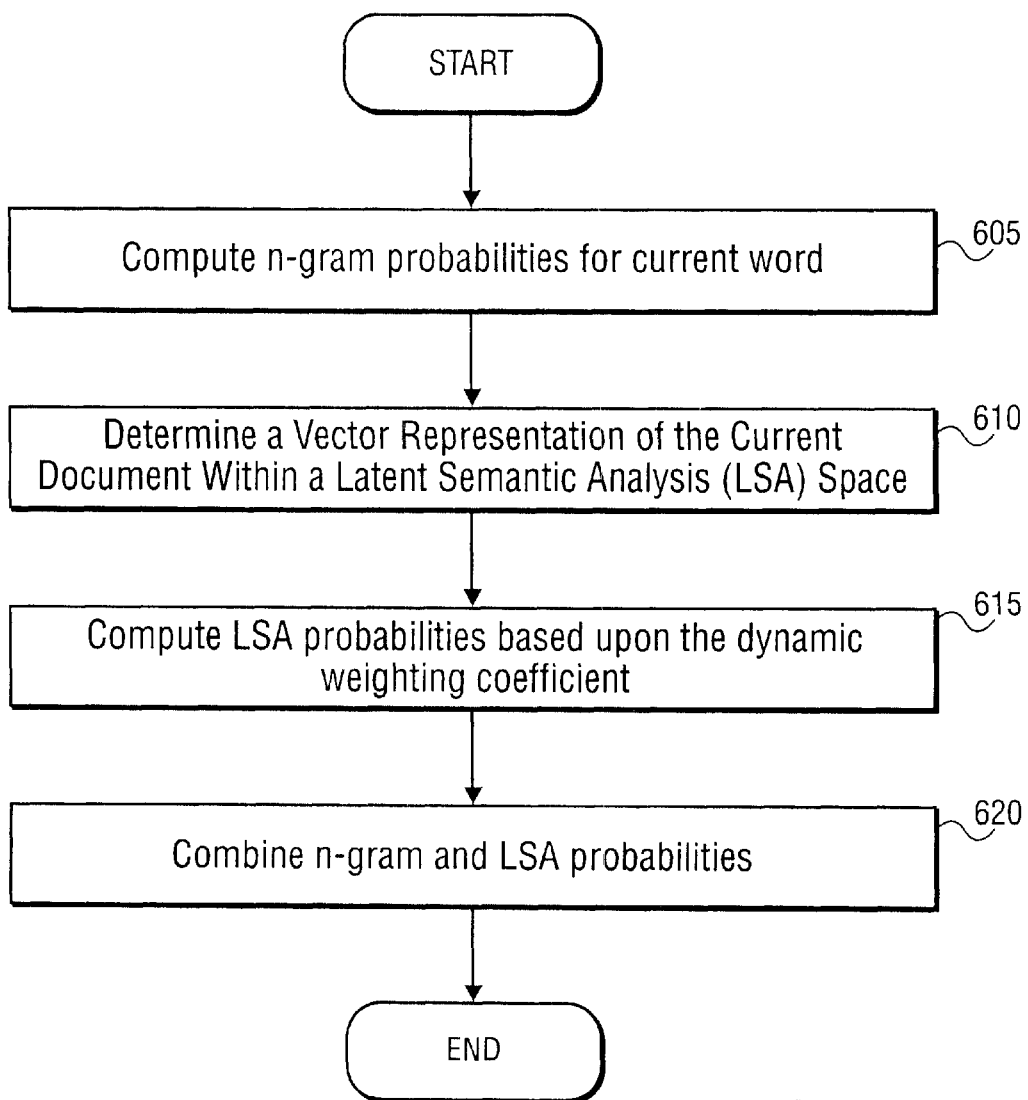
FIG. 6 is a flow diagram of one embodiment for dynamic selection of context scope in latent semantic analysis (LSA) language modeling.

FIG. 6 is a flow diagram of one embodiment for dynamic selection of context scope in latent semantic analysis (LSA) language modeling. Initially at processing block 605, the n-gram (local) probabilities for the current word are computed. The n-gram probabilities define the likelihood that a particular word within the system vocabulary (defined by Lexicon 112) will occur immediately following a string of n−1 words which are also within the system vocabulary. Language model 130 provides that for each word $w_q$ in an available vocabulary V, a conditional probability $Pr(w_q|H_q^{(T)})$ that the word $w_q$ will occur given a local context, or history, $H_q$, consisting of a string of n−1 words $w_{q-1}$, $w_{q-2}, \ldots w_{q-n+1}$, as follows:

$$Pr(w_q|H_q^{(l)}) = Pr(w_q|\omega W_{q-2} \ldots w_{q-n+1}). \quad (5)$$

Given a set of probabilities defined in accordance with equation (5), the recognition processor 160 can search for, and assess the likelihood of, various text hypotheses in producing the output message. The Probabilities $Pr(w_q|H_q^{(T)})$ may be estimated during a training phase using existing text databases. For example, the Linguistic Data Consortium sponsored by the Advanced Research Project Agency (ARPA) provides a wide range of application-specific databases which can be used for training purposes.

At processing block 610, a vector representation of the current document in a latent semantic analysis (LSA) space is determined.

In one embodiment, all utterances spoken since the beginning of the session are part of the current document. It can be shown from (1), that this approach corresponds to the following closed form for the pseudo-document $\tilde{d}_q$, at time q, in which the vector representation of the current document in the LSA space, $\tilde{v}_q$, is computed as follows:

$$\tilde{v}_q = \frac{1}{n_q} \sum_{p=1}^{q} (1 - \varepsilon_{i_p}) u_{i_p} S^{-1}. \tag{6}$$

in which $n_q$ is the total number of words present in the pseudo-document at time q, $I_{-p}$ is the index of the word observed at time p, and $\varepsilon_{i_p}$ is the normalized entropy of this word in the corpus T. However, this embodiment is only adequate if the user starts a new session each time s/he wants to work on a new document. If the user needs to dictate in an heterogeneous manner, this solution will fail, because the pseudo-document $\tilde{d}_q$ built under this embodiment will not be sufficiently representative of each individual document.

In an alternate embodiment, the size of the history considered is limited, so as to avoid relying on old, possibly obsolete fragments to construct the current context. The size limit could be expressed in anything from words to paragraphs. If, for example, only the last P words are assumed to belong to the current document, this approach corresponds to computing the latest pseudo-document vector using a truncated version of (5), as follows:

$$\tilde{v}_q = \frac{1}{P} \sum_{p=q-P+1}^{q} (1 - \varepsilon_{i_p}) u_{i_p} S^{-1} \tag{7}$$

The constant P is highly dependent on the kind of documents spoken by the user.

In an alternate embodiment, it is possible to adopt an intermediate solution, which allows for some discounting of old data without requiring a hard decision of the size of the caching window. In this embodiment, exponential forgetting is used to progressively discount older utterances. Assuming $0 < \lambda \leq 1$, this approach corresponds to the closed form solution given by:

$$\tilde{v} = \frac{1}{n_q} \sum_{p=1}^{q} \lambda^{(nq-np)} (1 - \varepsilon_{i_p}) u_{i_p} S^{-1}. \tag{8}$$

where the gap between $\lambda$ and 1 tracks the expected heterogeneity of the session. In addition, a hard limit may be concurrently placed on the size of the history as in (6).

At processing block 615, the LSA (global) probabilities based upon the vector representation of the current document in a latent semantic analysis (LSA) space is computed as described in reference to FIG. 3.

At processing block 620, the n-gram and LSA probabilities are combined. The hybrid n-gram+LSA language model probability is computed as follows:

$$Pr(w_q|\tilde{H}_{q-1}) = \frac{Pr(w_q|w_{q-1}w_{q-2} \ldots w_{q-n+1})Pr(\tilde{d}_{q-1}|w_q)}{\sum_{w_i \in V} Pr(w_i|w_{q-1}w_{q-2} \ldots w_{q-n+1})Pr(\tilde{d}_{q-1}|w_i)} \tag{11}$$

where $\tilde{H}_{q-1}$ is the overall available history (comprising an n-gram component as well as the LSA component mentioned above).

Preliminary experiments were conducted on a subset of the Wall Street Journal 20,000 word-vocabulary, continuous speech task. The acoustic training corpus consisted of 7,200 sentences of data uttered by 84 different native speakers of English. The language model training corpus was the ARPA North American Business News corpus, as previously described in U.S. Pat. No. 5,839,106, herein incorporated by reference. All experiments were performed using the hybrid bigram+LSA language model obtained in U.S. Pat. No. 5,839,106.

This system was tested on 12 additional native speakers of English, who uttered a total of 496 test sentences. This test corpus was constructed with no more than 3 or 4 consecutive sentences extracted from a single article. Overall, the corpus comprised 140 cument fragments which means that each speaker spoke, on the average, about 12 different "mini-documents." As a result, the context effectively changed every 60 words or so. This is a situation where appropriately forgetting the context is the key to avoid relying on an obsolete representation.

We performed dynamic context scope selection using the exponential forgetting framework described above. The value of the parameter $\lambda$ varied from $\lambda=1$ (unbounded context) to $\lambda=0.95$ (restrictive context) in decrements of 0.01 the results are presented in Table 1. It can be seen that performance improves substantially with a modicum of exponential forgetting ($0.97 < \lambda < 1$), as the pseudo-document representation becomes less and less contaminated with obsolete data. However, if forgetting is too aggressive (here, for $\lambda < 0.97$), the performance starts degrading, because the effective context no longer has a length appropriate to the task at hand.

| Speaker | $\lambda = 1.0$ | $\lambda = 0.99$ | $\lambda = 0.98$ | $\lambda = 0.97$ | $\lambda = 0.96$ | $\lambda = 0.95$ |
|---|---|---|---|---|---|---|
| 001 | 7.7% | 11.9% | 11.2% | 4.9% | -2.1% | -3.5% |
| 002 | 27.7% | 33.3% | 33.9% | 35.0% | 37.9% | 36.2% |
| 00a | 15.7% | 25.2% | 21.2% | 25.9% | 23.0% | 20.8% |
| 00b | 8.2% | 9.7% | 7.8% | 9.7% | 7.8% | 7.8% |
| 00c | 10.3% | 12.9% | 17.6% | 16.5% | 16.5% | 16.2% |
| 00d | 16.1% | 27.8% | 33.6% | 35.4% | 39.2% | 33.0% |
| 00f | 10.7% | 11.1% | 15.3% | 16.9% | 16.5% | 16.9% |
| 203 | 15.4% | 21.5% | 32.2% | 34.2% | 33.6% | 28.9% |
| 400 | 15.9% | 17.0% | 18.1% | 19.8% | 19.2% | 16.5% |
| 430 | 12.6% | 19.3% | 20.2% | 17.6% | 15.4% | 10.9% |
| 431 | 8.9% | 15.0% | 18.3% | 18.3% | 17.8% | 13.6% |
| 432 | 11.2% | 16.2% | 23.5% | 27.9% | 27.9% | 26.3% |
| Overall | 13.2% | 18.4% | 21.1% | 21.9% | 21.6% | 19.3% |

The specific arrangements and methods herein are merely illustrative of the principles of this invention. Numerous modifications in form and detail may be made by those skilled in the art without departing from the true spirit and scope of the invention.

What is claimed is:

1. A method of dynamic language modeling of a document comprising:

computing a plurality of local probabilities of a current document;

determining a vector representation of the current document in a latent semantic analysis (LSA) space, wherein the vector representation of the current document in an LSA space is based upon a plurality of temporally ordered words and is generated from at least one decomposition matrix of a singular value decomposition of a co-occurrence matrix, W, between M words in a vocabulary V and N documents in a text corpus T;

computing a plurality of global probabilities based upon the vector representation of the current document in an LSA space; and combining the local probabilities and the global probabilities to produce the language modeling.

2. The method of claim 1 wherein the plurality of local probabilities is based upon an n-gram paradigm.

3. The method of claim 1 wherein the plurality of local probabilities $Pr(w_q|H_q^{(l)})$ for a particular word $w_q$, drawn from a vocabulary V comprising a plurality of words $w_i$, given a local contextual history $H_q^{(l)}$ of n−1 words $w_{q-1}$, $w_{q-2}$, ... $w_{q-n+1}$, as:

$$Pr(w_q|H_q^{(l)})=Pr(w_q|w_{q-1}W_{q-2} \ldots w_{q-n+1}).$$

4. The method of claim 1 wherein the vector representation of the current document in an LSA space is based upon all words from a beginning of a session.

5. The method of claim 4 wherein the vector representation of the current document in an LSA space, $v_q$, at time q, wherein $n_q$ is the total number of words in the current document, $i_p$ is the index of the word observed at time p, $\epsilon_{i_p}$ is the normalized entropy of the word observed at time p within a text T, $\mu_{i_p}$ is the left singular vector at time p of the singular value decomposition of W, and S is the diagonal matrix of singular values of the singular value decomposition of W, as:

$$\tilde{v}_q = \frac{1}{n_q}\sum_{p=1}^{q}(1-\varepsilon_{i_p})u_{i_p}S^{-1}.$$

6. The method of claim 1 wherein the vector representation of the current document in an LSA space, $v_q$, at time q, wherein $n_q$ is the total number of words in the current document, $i_p$ is the index of the word observed at time p, $\epsilon_{i_p}$ is the normalized entropy of the word observed at time p within a text T, P is the number of temporally adjacent words up to the current word, $\mu_{i_p}$ is the left singular vector at time p of the singular value decomposition of W, and S is the diagonal matrix of singular values of the singular value decomposition of W, as:

$$\tilde{v}_q = \frac{1}{P}\sum_{p=q-P+1}^{q}(1-\varepsilon_{i_p})u_{i_p}S^{-1}.$$

7. The method of claim 1 wherein the vector representation of the current document in an LSA space is based upon a plurality of exponentially weighted temporally ordered words.

8. The method of claim 7 wherein the vector representation of the current document in an LSA space, $v_q$, at time q, wherein $n_q$ is the total number of words in the current document, $i_p$ is the index of the word observed at time p, $\epsilon_{i_p}$ is the normalized entropy of the word observed at time p within a text T, $0<\lambda\leq 1$, $\mu_{i_p}$ is the left singular vector at time p of the singular value decomposition of W, and S is the diagonal matrix of singular values of the singular value decomposition of W, as:

$$\tilde{v} = \frac{1}{n_q}\sum_{p=1}^{q}\lambda^{(n_q-np)}(1-\varepsilon_{i_p})u_{i_p}S^{-1}.$$

9. The method of claim 1 wherein the plurality of global probabilities is based upon a latent semantic paradigm.

10. The method of claim 1 wherein the plurality of global probabilities $Pr(w_q|H_{q-1})$ for a particular word $w_q$, for an associated history of the word, $H_{q-1}$, for the current document $\tilde{d}_{q-i}$, as:

$$Pr(w_q|H_{q-1})=Pr(w_q|\tilde{d}_{q-i}),$$

based upon the vector representation of the current document in an LSA space.

11. The method of claim 10 wherein combining the local probabilities and the global probabilities is computed as follows:

$$Pr(w_q|\tilde{H}_{q-1}) = \frac{Pr(w_q|w_{q-1}w_{q-2} \ldots w_{q-n+1})Pr(\tilde{d}_{q-1}|w_q)}{\sum_{w_i \in V}Pr(w_i|w_{q-1}w_{q-2} \ldots w_{q-n+1})Pr(\tilde{d}_{q-1}|w_i)}.$$

12. A system for dynamic language modeling of a document comprising:
means for computing a plurality of local probabilities of a current document;
means for determining a vector representation of the current document in a latent semantic analysis (LSA) space based upon a plurality of temporally ordered words and is generated from at least one decomposition matrix of a singular value decomposition of a co-occurrence matrix, W, between M words in a vocabulary V and N documents in a text corpus T;
means for computing a plurality of global probabilities based upon the vector representation of the current document in an LSA space; and
means for combining the local probabilities and the global probabilities to produce the language modeling.

13. The system of claim 12 wherein the plurality of local probabilities is based upon an n-gram paradigm.

14. The system of claim 12 wherein the plurality of local probabilities $Pr(w_q|H_q^{(l)})$ for a particular word $w_q$, drawn from a vocabulary V comprising a plurality of words $w_i$, given a local contextual history $H_q^{(l)}$ of n−1 words $w_{q-1}$, $w_{q-2}$, ... $w_{q-n+1}$, as:

$$Pr(w_q|H_q^{(l)})=Pr(w_q|w_{q-1}W_{q-2} \ldots w_{q-n+1}).$$

15. The method of claim 12 wherein the vector representation of the current document in an LSA space is based upon all words from a beginning of a session.

16. The method of claim 15 wherein the vector representation of the current document in an LSA space, $v_q$, at time q, wherein $n_q$ is the total number of words in the current document, $i_p$ is the index of the word observed at time p, $\epsilon_{i_p}$ is the normalized entropy of the word observed at time p within a text T, $\mu_{i_p}$ is the left singular vector at time p of the singular value decomposition of W, and S is the diagonal matrix of singular values of the singular value decomposition of W, as:

$$\tilde{v}_q = \frac{1}{n_q}\sum_{p=1}^{q}(1-\varepsilon_{i_p})u_{i_p}S^{-1}.$$

17. The method of claim 12 wherein the vector representation of the current document in an LSA space, $v_q$, at time q, wherein $n_q$ is the total number of words in the current document, $i_p$ is the index of the word observed at time p, $\epsilon_{i_p}$ is the normalized entropy of the word observed at time p within a text T, P is the number of temporally adjacent words up to the current word, $\mu_{i_p}$ is the left singular vector at time p of the singular value decomposition of W, and S is the diagonal matrix of singular values of the singular value decomposition of W, as:

$$\tilde{v}_q = \frac{1}{P} \sum_{p=q-P+1}^{q} (1 - \varepsilon_{i_p}) u_{i_p} S^{-1}.$$

18. The system of claim 12 wherein the vector representation of the current document in an LSA space is based upon a plurality of exponentially weighted temporally ordered words.

19. The method of claim 18 wherein the vector representation of the current document in an LSA space, $v_q$, at time q, wherein $n_q$ is the total number of words in the current document, $i_p$ is the index of the word observed at time p, $\varepsilon_{i_p}$ is the normalized entropy of the word observed at time p within a text T, $0 < \lambda \leq 1$, $\mu_{i_p}$ is the left singular vector at time p of the singular value decomposition of W, as:

$$\tilde{v} = \frac{1}{n_q} \sum_{p=1}^{q} \lambda^{(nq-np)} (1 - \varepsilon_{i_p}) u_{i_p} S^{-1}.$$

20. The method of claim 12 wherein the plurality of global probabilities is based upon a latent semantic paradigm.

21. The method of claim 1 wherein the plurality of global probabilities $Pr(w_q|H_{q-1})$ for a particular word $w_q$, for an associated history of the word, $H_{q-1}$, for the current document $\tilde{d}_{q-i}$, as:

$$\tilde{v}_q = \frac{1}{n_q} \sum_{p=1}^{q} (1 - \varepsilon_{i_p}) u_{i_p} S^{-1}.$$

$$Pr(w_q|H_{q-1}) = Pr(w_q|\tilde{d}_{q-i}),$$

based upon the vector representation of the current document in an LSA space.

22. The method of claim 21 wherein combining the local probabilities and the global probabilities is computed as follows:

$$\Pr(w_q|\tilde{H}_{q-1}) = \frac{\Pr(w_q|w_{q-1}w_{q-2} \ldots w_{q-n+1})\Pr(\tilde{d}_{q-1}|w_q)}{\sum_{w_i \in V} \Pr(w_i|w_{q-1}w_{q-2} \ldots w_{q-n+1})\Pr(\tilde{d}_{q-1}|w_i)}.$$

23. A computer readable medium comprising instructions, which when executed on a processor, perform a method for dynamic language modeling of a document, comprising:
computing a plurality of local probabilities of a current document;
determining a vector representation of the current document in a latent semantic analysis (LSA) space based upon a plurality of temporally ordered words and is generated from at least one decomposition matrix of a singular value decomposition of a co-occurrence matrix, W, between M words in a vocabulary V and N documents in a text corpus T;
computing a plurality of global probabilities based upon the vector representation of the current document in an LSA space; and
combining the local probabilities and the global probabilities to produce the language modeling.

24. The computer-readable medium of claim 23 wherein the plurality of local probabilities is based upon an n-gram paradigm.

25. The computer-readable medium of claim 23 wherein the plurality of local probabilities $Pr(w_q|H_q^{(l)})$ for a particular word $w_q$, drawn from a vocabulary V comprising a plurality of words $w_i$, given a local contextual history $H_q^{(T)}$ of n−1 words $w_{q-1}, w_{q-2}, \ldots w_{q-n+1}$, as:

$$Pr(w_q|H_q^{(l)}) = Pr(w_q|w_{q-1}W_{q-2} \ldots w_{q-n+1}).$$

26. The computer-readable medium of claim 23 wherein the vector representation of the current document in an LSA space is based upon all words from a beginning of a session.

27. The computer-readable medium of claim 26 wherein the vector representation of the current document in an LSA space, $v_q$, at time q, wherein $n_q$ is the total number of words in the current document, $i_p$ is the index of the word observed at time p, $\varepsilon_{i_p}$ is the normalized entropy of the word observed at time p within a text T, $\mu_{i_p}$ is the left singular vector at time p of the singular value decomposition of W, and S is the diagonal matrix of singular values of the singular value decomposition of W, as:

$$\tilde{v}_q = \frac{1}{n_q} \sum_{p=1}^{q} (1 - \varepsilon_{i_p}) u_{i_p} S^{-1}.$$

28. The computer-readable medium of claim 23 wherein the vector representation of the current document in an LSA space, $v_q$, at time q, wherein $n_q$ is the total number of words in the current document, $i_p$ is the index of the word observed at time p, $\varepsilon_{i_p}$ is the normalized entropy of the word observed at time p within a text T, P is the number of temporally adjacent words up to the current word, $\mu_{i_p}$ is the left singular vector at time p of the singular value decomposition of W, and S is the diagonal matrix of singular values of the singular value decomposition of W, as:

$$\tilde{v}_q = \frac{1}{P} \sum_{p=q-P+1}^{q} (1 - \varepsilon_{i_p}) u_{i_p} S^{-1}.$$

29. The computer-readable medium of claim 23 wherein the vector representation of the current document in an LSA space is based upon a plurality of exponentially weighted temporally ordered words.

30. The computer-readable medium of claim 29 wherein the vector representation of the current document in an LSA space, $v_q$, at time q, wherein $n_q$ is the total number of words in the current document, $i_p$ is the index of the word observed at time p, $\varepsilon_{i_p}$ is the normalized entropy of the word observed at time p within a text T, $0 < \lambda \leq 1$, $\mu_{i_p}$ is the left singular vector at time p of the singular value decomposition of W, and S is the diagonal matrix of singular values of the singular value decomposition of W, as:

$$\tilde{v} = \frac{1}{n_q} \sum_{p=1}^{q} \lambda^{(nq-np)} (1 - \varepsilon_{i_p}) u_{i_p} S^{-1}.$$

31. The computer-readable medium of claim 23 wherein the plurality of global probabilities is based upon a latent semantic paradigm.

32. The computer-readable medium of claim 23 wherein the plurality of global probabilities $Pr(w_q|H_{q-1})$ for a particular word $w_q$, for an associated history of the word, $H_{q-1}$, for the current document $\tilde{d}_{q-i}$, as:

$$Pr(w_q|H_{q-1}) = Pr(w_q|\tilde{d}_{q-i}),$$

based upon the vector representation of the current document in an LSA space.

33. The computer-readable medium of claim 32 wherein combining the local probabilities and the global probabilities is computed as follows:

$$\Pr(w_q|\tilde{H}_{q-1}) = \frac{\Pr(w_q|w_{q-1}w_{q-2} \ldots w_{q-n+1})\Pr(\tilde{d}_{q-1}|w_q)}{\sum_{w_i \in V} \Pr(w_i|w_{q-1}w_{q-2} \ldots w_{q-n+1})\Pr(\tilde{d}_{q-1}|w_i)}$$

34. A system for dynamic language modeling of a document comprising a hybrid training/recognition processor configured to compute a plurality of local probabilities of a current document, determine a vector representation of the current document in a latent semantic analysis (LSA) space, compute a plurality of local probabilities based upon the vector representation of the current document in an LSA space, and combine the local probabilities and the global probabilities to produce the language modeling, wherein the processor is further configured to generate the vector representation of the current document in an LSA space based upon a plurality of temporally ordered words from at least one decomposition matrix of a singular value decomposition of a co-occurrence matrix, W, between M words in a vocabulary V and N documents in a text corpus T.

35. The system of claim 34 wherein the processor is further configured to generate the plurality of local probabilities based upon an n-gram paradigm.

36. The system of claim 34 wherein the processor is further configured to generate the plurality of local probabilities $\Pr(w_q|H_q^{(t)})$ for a particular word $w_q$, drawn from a vocabulary V comprising a plurality of words $w_i$, given a local contextual history $H_q^{(T)}$ of n−1 words $w_{q-1}, w_{q-2}, \ldots w_{q-n+1}$, as:

$$Pr(w_q|H_q^{(t)}) = Pr(w_q|w_{q-1}W_{q-2} \ldots w_{q-n+1}).$$

37. The system of claim 34 wherein the processor is further configured to generate the vector representation of the current document in an LSA space based upon all words from a beginning of a session.

38. The method of claim 37 wherein the the processor is further configured to generate the vector representation of the current document in an LSA space, $v_q$, at time q, wherein $n_q$ is the total number of words in the current document, $i_p$ is the index of the word observed at time p, $\epsilon_{i_p}$ is the normalized entropy of the word observed at time p within a text T, $\mu_{i_p}$ is the left singular vector at time p of the singular value decomposition of W, and S is the diagonal matrix of singular values of the singular value decomposition of W, as:

$$\tilde{v}_q = \frac{1}{n_q}\sum_{p=1}^{q}(1-\epsilon_{i_p})u_{i_p}S^{-1}.$$

39. The system of claim 34 wherein the processor is further configured to generate the vector representation of the current document in an LSA space, $v_q$, at time q, wherein $n_q$ is the total number of words in the current document, $i_p$ is the index of the word observed at time p, $\epsilon_{i_p}$ is the normalized entropy of the word observed at time p within a text T, P is the number of temporally adjacent words up to the current word, $\mu_{i_p}$ is the left singular vector at time p of the singular value decomposition of W, and S is the diagonal matrix of singular values of the singular value decomposition of W, as:

$$\tilde{v}_q = \frac{1}{P}\sum_{p=q-P+1}^{q}(1-\epsilon_{i_p})u_{i_p}S^{-1}.$$

40. The method of claim 34 wherein the processor is further configured to generate the vector representation of the current document in an LSA space is based upon a plurality of exponentially weighted temporally ordered words.

41. The method of claim 40 wherein the the processor is further configured to generate the vector representation of the current document in an LSA space, $v_q$, at time q, wherein $n_q$ is the total number of words in the current document, $i_p$ is the index of the word observed at time p, $\epsilon_{i_p}$ is the normalized entropy of the word observed at time p within a text T, $0<\lambda\leq 1$, $\mu_{i_p}$ is the left singular vector at time p of the singular value decomposition of W, and S is the diagonal matrix of singular values of the singular value decomposition of W, as:

$$\tilde{v} = \frac{1}{n_q}\sum_{p=1}^{q}\lambda^{(nq-np)}(1-\epsilon_{i_p})u_{i_p}S^{-1}.$$

42. The system of claim 34 wherein the processor is further configured to generate the plurality of global probabilities based upon a latent semantic paradigm.

43. The system of claim 34 wherein the processor is further configured to generate the plurality of local probabilities $\Pr(w_q|H_{q-1})$ for a particular word $w_q$, for an associated history of the word, $H_{q-1}$, for the current document $\tilde{d}_{q-i}$, as:

$$Pr(w_q|H_{q-1}) = Pr(w_q|\tilde{d}_{q-i}),$$

based upon the vector representation of the current document in an LSA space.

44. The system of claim 43 wherein the processor is further configured to combine the local probabilities and the global probabilities as follows:

$$\Pr(w_q|\tilde{H}_{q-1}) = \frac{\Pr(w_q|w_{q-1}w_{q-2} \ldots w_{q-n+1})\Pr(\tilde{d}_{q-1}|w_q)}{\sum_{w_i \in V} \Pr(w_i|w_{q-1}w_{q-2} \ldots w_{q-n+1})\Pr(\tilde{d}_{q-1}|w_i)}.$$

* * * * *